219-121 SR

MTR04 XR 3,056,881

Oct. 2, 1962 H. J. SCHWARZ 3,056,881

METHOD OF MAKING ELECTRICAL CONDUCTOR DEVICE

Filed June 7, 1961

INVENTOR
HELMUT J. SCHWARZ
BY Leonard F. Weklind
ATTORNEY

United States Patent Office 3,056,881

Patented Oct. 2, 1962

3,056,881
METHOD OF MAKING ELECTRICAL CONDUCTOR DEVICE

Helmut J. Schwarz, Simsbury, Conn., assignor to United Aircraft Corporation, East Hartford, Conn., a corporation of Delaware Filed June 7, 1961, Ser. No. 115,500
20 Claims. (Cl. 219—50)

This invention relates to electrical conductor devices and more particularly to a method of making conductor devices, thin film resistors, and capacitors and printed circuits.

In making metalized electronic circuits or thin film resistors or capacitors, vacuum deposition has been resorted to as one method of applying very thin coatings of the conductive material. Another method comprises the application of reducing agents to a pattern which is formed on a wafer. This assembly is then heated in a gas environment and the pattern of metal is "fired-on." This process is expensive, unwieldy and subject to inaccuracies and distortions. One of the chief problems and possible disadvantages of present methods is that minute distortions or steps occur in the surface which will produce a shadow effect appearance and good electrical contacts are not obtainable.

It is an object of this invention to provide a method for making thin film resistors, capacitors, or electronic circuits which have very smooth finishes which are easily obtainable.

It is a primary object of this invention to use, for example, a substrate material, such as an alumina wafer, which is exposed on its surface to radiant energy such as an electron beam in the presence of a reducing agent. The beam trace reduces the normally non-conductive oxide to pure aluminum or other similar metal which then becomes the conductive portion of the device.

It is a further object of this invention to provide a method of manufacture of the type described which is adaptable to any metal oxide ceramics and is especially adapted to automatic production with the use of an electron beam in the presence of a reducing agent.

These and other objects of this invention will become readily apparent and the following description of the drawing in which.

Figures 1, 2, 3:
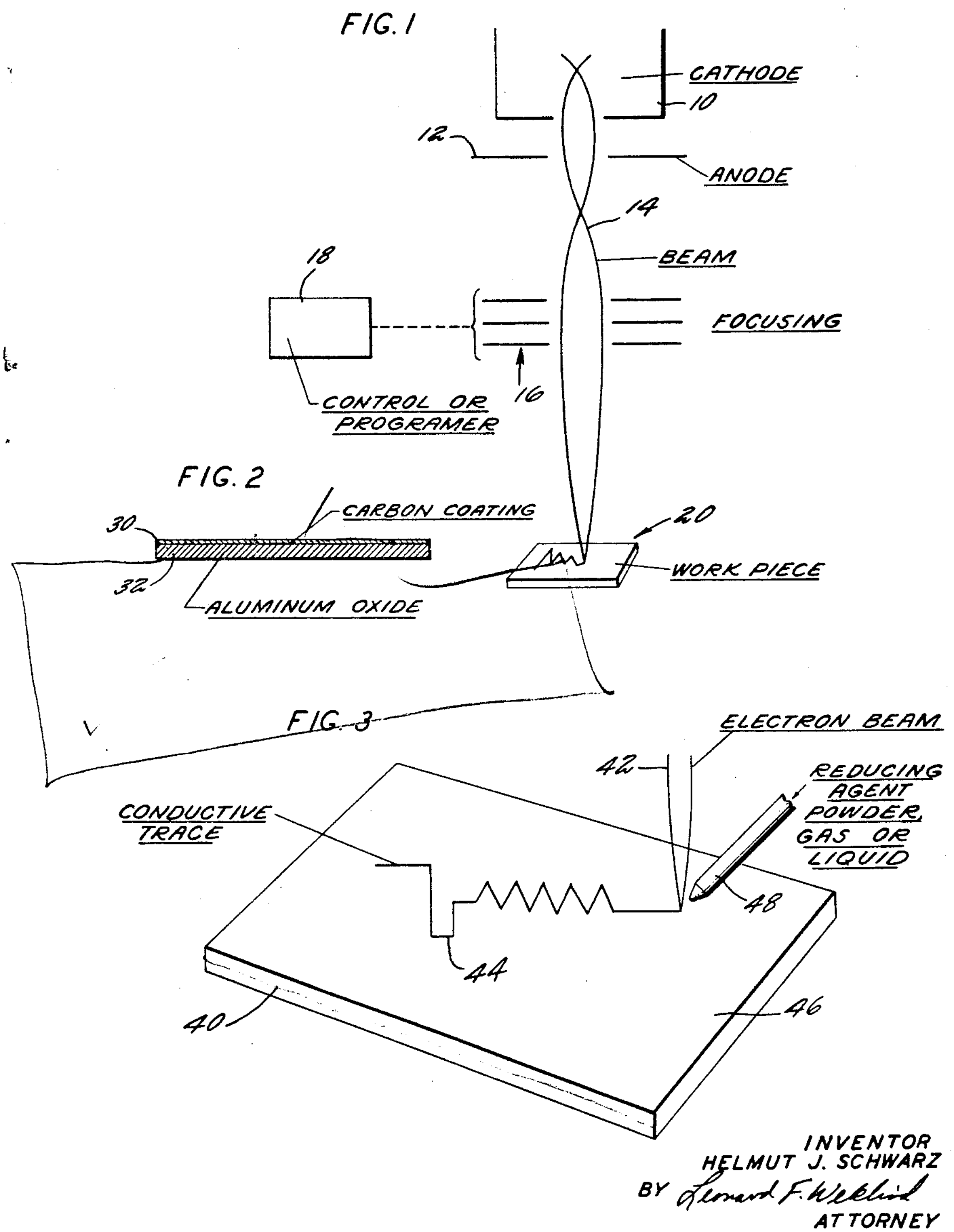
FIG. 1 is a schematic illustration of an electron beam mechanism, impinging on a work-piece on which is produced a conductive pattern.
FIG. 2 is a cross-sectional illustration of one form of base material which can be used and exposed to a radiant energy beam.
FIG. 3 is a perspective and schematic illustration of a typical electric circuit pattern which can be made in accordance with one modification of this invention.

Referring to FIG. 1, a typical electron beam machine or other suitable device for producing radiant energy can be used. Thus a cathode 10 is provided as well as an anode 12 with a suitable power source and electron beam 14 is produced which can be focused by a suitable focusing means generally indicated at 16. A control device 18 may be provided to either shape or deflect the beam 14 with respect to the work-piece generally indicated at 20. Either the beam 14 can be moved to trace a pattern on the work-piece 20 or the work-piece itself may be moved relative to the beam.

The electron beam may be of the type disclosed in any of the following patents:

| Patent No. | Date | Inventor |
|---|---|---|
| 2,778,926 | 1/22/57 | W. Schneider. |
| 2,793,281 | 5/21/57 | K. H. Steigerwald. |
| 2,860,251 | 11/11/58 | S. Pakswer et al. |

The electron beam machine may be of the general type also illustrated in the article "Electron Beams Machine by Vaporization" on page 986 of June 5, 1959, issue of Metalworking Production.

According to this invention, a normally non-conductive metal oxide such as alumina (aluminum oxide) can be used as the base material. The base material may be shaped in any suitable fashion to coincide with the final product desired. According to one form of this invention, the surface of the aluminum oxide, see FIG. 2, may be coated with a carbon powder 30 which is suspended in a volatile binder and can be painted on the substrate material 32. One type of liquid adhesive is commercially known as "Aquadag" which is a suspension of carbon in alcohol. The electron beam of FIG. 1 can be programmed in such a way that it provides the desired pattern for the circuit connections on the alumina substrate 32. The heat from the electron beam reduces the aluminum oxide on the surface to pure aluminum with the oxygen combining with the carbon to form $CO_2$. With aluminum oxide pure aluminum patterns are formed on the surface, which is a good conductor whether used for circuitry or transistors or the like.

The unaffected areas of the treated surfaces of the substrate can thereafter be cleaned. Of course, the suspension binder which holds the binder can be chosen such that the cleaning step can be done readily without leaving any contaminations or residue.

It will be understood that the foregoing process is equally applicable for use with other combinations of metal oxide and reducing agents.

FIG. 3 schematically illustrates another modification of the foregoing process and eliminates the necessity of coating the substrate surface. Thus the substrate 40, which may be of aluminum oxide or other similar oxide, will have an electron beam 42 tracing a circuit 44 on the surface 46. A reducing agent in powder or gas form can be caused to impinge at the contact point of the beam by means of a suitable nozzle 48. The reducing agent can be carbon in powder form or a reducing gas such as hydrogen may be used with equal effectiveness. Liquid reducing agents containing carbon and having a low vapor pressure may also be used if the electron beam must operate in a low pressure atmosphere. Silicone oils may be one example. Other gaseous reducing fluids may be $CO_2$ or carbon tetrafluoride.

As a result of this invention, it will be apparent that any forms of electrical devices or circuitry can be provided in highly metallized form and at high speeds which is readily adaptable to automatic production. Thus with a properly programmed electron beam or other source of heat, energy can be used to impinge upon any form of substrate material of the type described and to produce them in large numbers at extremely high speeds.

Although several embodiments of this invention have been illustrated and described herein, it will be apparent

TJ 1
M3 that various changes and modifications may be made in the construction arrangement of the various parts without departing from the scope of this novel concept.

What it is desired by Letters Patent is:

1. In a method of making a conductive circuit on a non-conductive substrate material capable of being conductive in a reduced state, the step of exposing the surface of the substrate to a beam of energy in a reducing environment along a pattern and reducing the material on the surface and in said pattern only to a conductive state.

2. In a method of making a conductive circuit on a non-conductive substrate material capable of being conductive in a reduced state, the steps of applying a reducing agent to at least a portion of a surface of the substrate exposing the substrate surface in the vicinity of the applied agent to an electron energy beam having a predetermined pattern to reduce the material on said surface to a conductive state in said pattern only.

3. A method of making a conductive circuit on a substrate material having a non-conductive surface capable of being conductive in a reduced state, the steps consisting of supplying a reacting agent to at least a portion of said surface, exposing the substrate surface in the vicinity of said reacting agent to a relatively fine beam of heating energy along a predetermined path to reduce the material on said surface to a conductive state only in said path.

4. A method according to claim 3 wherein said beam is directed along a predetermined path.

5. A method of making an electrical element including a base having a metal oxide on the surface of said base, the step of tracing a pattern of heat energy in the form of a fine beam on said surface and in the presence of a reducing agent to change the characteristics of said oxide only in said pattern.

6. A method of making an electrical device having a non-conductive base and a metal oxide surface, the steps of applying a reducing agent to said surface, exposing a portion of said surface to a beam of heating energy to cause reaction of said agent with said surface to reduce the oxide only in the path of said beam to form a conductive path on said surface.

7. A method according to claim 6 wherein said oxide is aluminum oxide.

8. A method according to claim 6 wherein said base is alumina.

9. A method according to claim 6 wherein said reducing agent contains carbon.

10. A method according to claim 6 wherein said reducing agent is a fluid.

11. A method according to claim 6 wherein said heating energy is an electron beam.

12. A method of making a conductive circuit on a non-conductive base, the steps comprising, exposing a wafer of alumina to an electron beam having a small tracing path, and providing a reducing agent in the vicinity of said path to reduce the surface of said base in said path only.

13. A method of making a conductive circuit, the steps comprising, coating a base of alumina with carbon, exposing portions of said base in a desired pattern with a controlled electron beam to reduce the surface of the alumina in the exposed region, and removing the excess carbon.

14. In combination, a non-conductive work-piece having a metal oxide surface, means for impinging a high energy beam on said surface, means for relatively moving said beam with respect to said work-piece in a predetermined manner to trace a path over said surface, and means providing a reducing agent in the vicinity of said path while said path is being traced to change the characteristics of said surface only in said path.

15. A combination according to claim 14 including a nozzle for conducting a stream of reducing agent in the vicinity of the impingement of said beam.

16. A combination according to claim 15 including a source of powdered reducing agent connected to said nozzle.

17. A combination according to claim 15 including a source of liquid reducing agent connected to said nozzle.

18. A combination according to claim 15 including a source of gaseous reducing agent connected to said nozzle.

19. A method of changing the state of a base material at least on its surface and in a limited region, the steps of supplying reacting material at least in said limited region, and exposing said limited region to a relatively small electron beam to cause heating only in said limited region and reaction of said materials.

20. A method of changing the state of a base metal at least on its surface and in a limited region, the steps of supplying reacting agent at least in said limited region, and exposing said limited region to a relatively small electron beam to cause heating only in said limited region and reaction of said metal and said agent only in said region.

References Cited in the file of this patent

UNITED STATES PATENTS

| | | |
|---|---|---|
| 2,027,413 | Andres | Jan. 14, 1936 |
| 2,778,926 | Schneider | Jan. 22, 1957 |